(12) United States Patent
Harve et al.

(10) Patent No.: US 10,428,541 B2
(45) Date of Patent: Oct. 1, 2019

(54) PORTABLE, PROTECTIVE SHELTER

(71) Applicants: Shweta Harve, Plano, TX (US);
Fermin Baeza, Bonham, TX (US)

(72) Inventors: Shweta Harve, Plano, TX (US);
Fermin Baeza, Bonham, TX (US)

( * ) Notice: Subject to any disclaimer, the term of this patent is extended or adjusted under 35 U.S.C. 154(b) by 0 days.

(21) Appl. No.: 15/636,691

(22) Filed: Jun. 29, 2017

(65) Prior Publication Data
US 2018/0002939 A1 Jan. 4, 2018

Related U.S. Application Data

(60) Provisional application No. 62/356,277, filed on Jun. 29, 2016.

(51) Int. Cl.
| | |
|---|---|
| *E04H 1/12* | (2006.01) |
| *E04H 15/48* | (2006.01) |
| *E04B 1/12* | (2006.01) |
| *E04B 1/343* | (2006.01) |
| *A01K 1/03* | (2006.01) |
| *E04B 1/00* | (2006.01) |
| *E04B 1/61* | (2006.01) |
| *E04H 15/18* | (2006.01) |

(52) U.S. Cl.
CPC .......... *E04H 1/1205* (2013.01); *A01K 1/033* (2013.01); *E04B 1/12* (2013.01); *E04B 1/34321* (2013.01); *E04H 15/48* (2013.01); *E04B 1/34384* (2013.01); *E04B 2001/0053* (2013.01); *E04B 2001/6195* (2013.01); *E04H 1/12* (2013.01); *E04H 15/18* (2013.01)

(58) Field of Classification Search
CPC .. E04B 1/343; E04B 1/34315; E04B 1/34321; E04B 1/34357; E04B 1/34384; E04B 2001/34389
See application file for complete search history.

(56) References Cited

U.S. PATENT DOCUMENTS

| | | | | | |
|---|---|---|---|---|---|
| 2,647,287 | A | * | 8/1953 | Jones | E04B 1/34321 108/55.1 |
| 3,020,601 | A | * | 2/1962 | Stambaugh | A01K 1/033 446/105 |
| 4,744,111 | A | * | 5/1988 | Tegg | E04H 1/1216 4/460 |
| 5,184,436 | A | * | 2/1993 | Sadler | E04B 1/34321 446/478 |
| 5,351,453 | A | * | 10/1994 | Leslie | E04B 1/34321 446/110 |

(Continued)

*Primary Examiner* — Gisele D Ford
(74) *Attorney, Agent, or Firm* — Sheri Higgins; Sheri Higgins Law (57) ABSTRACT

A shelter includes: at least two side walls; a back wall; and a roof, wherein the side walls, the back wall, and the roof comprise a material that is weatherproof and insulated, and wherein the shelter is collapsible, detachable, and portable. The shelter can also include at least two side walls, wherein an upper end of the at least two side walls conjoin to form a roof. The shelter is lightweight, detachable, and portable. The shelter can be weatherproof and insulated for permanently or temporarily housing people and/or animals. The shelter can be transported to a desired location and assembled on-site with ease. When the use of the shelter is no longer desired, the shelter can be quickly disassembled and transported to another location.

16 Claims, 8 Drawing Sheets

(56) References Cited

U.S. PATENT DOCUMENTS

| | | | | |
|---|---|---|---|---|
| 5,657,583 A * | 8/1997 | Tennant | E04B 1/34321 | 52/270 |
| 5,921,047 A * | 7/1999 | Walker | E04B 1/6141 | 52/282.2 |
| 6,250,022 B1 * | 6/2001 | Paz | E04B 1/34321 | 312/100 |
| 8,557,121 B1 * | 10/2013 | Mendes | E02B 15/101 | 210/693 |
| 8,578,661 B1 * | 11/2013 | Braley | A01M 31/02 | 52/71 |
| 9,097,032 B1 * | 8/2015 | Al-Saffar | E04H 9/16 | |
| 9,920,513 B2 * | 3/2018 | Segall | E04B 1/34321 | |
| 2003/0140573 A1 * | 7/2003 | Marcinkowski | E04B 1/34321 | 52/79.5 |
| 2003/0205005 A1 * | 11/2003 | Paz | A01K 1/033 | 52/79.1 |
| 2004/0187402 A1 * | 9/2004 | Moon | E04B 1/34321 | 52/79.5 |
| 2005/0120641 A1 * | 6/2005 | Whitehead | E04B 1/34321 | 52/79.1 |
| 2005/0144859 A1 * | 7/2005 | Paz | A01K 1/033 | 52/79.1 |
| 2005/0210761 A1 * | 9/2005 | Mower | E04B 1/12 | 52/64 |
| 2005/0279034 A1 * | 12/2005 | Tsang | E04B 1/34315 | 52/79.1 |
| 2006/0277852 A1 * | 12/2006 | Mower | E04B 1/34321 | 52/270 |
| 2007/0175108 A1 * | 8/2007 | Stein | E04B 1/34321 | 52/79.5 |
| 2007/0209295 A1 * | 9/2007 | Mower | E04B 1/34321 | 52/79.1 |
| 2008/0216426 A1 * | 9/2008 | Bunker | E04B 1/34315 | 52/285.3 |
| 2008/0282623 A1 * | 11/2008 | Powell | E04B 1/04 | 52/71 |
| 2009/0000211 A1 * | 1/2009 | Lozier | E04H 9/14 | 52/23 |
| 2009/0013615 A1 * | 1/2009 | Kitagawa | E04B 1/3205 | 52/79.12 |
| 2009/0014044 A1 * | 1/2009 | Hartman | E04B 1/3445 | 135/143 |
| 2009/0223144 A1 * | 9/2009 | Leahy | E04B 1/34321 | 52/79.1 |
| 2009/0223161 A1 * | 9/2009 | Segall | E04B 1/34315 | 52/588.1 |
| 2009/0313925 A1 * | 12/2009 | Lyons | E04B 1/34315 | 52/274 |
| 2010/0043309 A1 * | 2/2010 | Martin | E03C 1/01 | 52/79.5 |
| 2011/0179722 A1 * | 7/2011 | Schulz | E04B 1/34315 | 52/79.1 |
| 2011/0258943 A1 * | 10/2011 | De Zen | E04B 1/34321 | 52/43 |
| 2011/0289860 A1 * | 12/2011 | Wilson | E04B 1/34315 | 52/79.5 |
| 2012/0055101 A1 * | 3/2012 | Schooley | E04H 1/1205 | 52/79.9 |
| 2012/0110926 A1 * | 5/2012 | Phillips | E04H 1/1205 | 52/79.9 |
| 2012/0180403 A1 * | 7/2012 | Kull | E04B 1/34321 | 52/79.1 |
| 2013/0091796 A1 * | 4/2013 | Thomas | E04H 1/1205 | 52/506.01 |
| 2013/0104994 A1 * | 5/2013 | Bettiol | E04B 1/12 | 137/1 |
| 2013/0192146 A1 * | 8/2013 | Anklam | E04H 1/1205 | 52/79.5 |
| 2014/0053481 A1 * | 2/2014 | Leahy | E04B 1/34321 | 52/270 |
| 2014/0109495 A1 * | 4/2014 | Segall | E04B 2/00 | 52/173.1 |
| 2014/0123572 A1 * | 5/2014 | Segall | G09B 9/003 | 52/79.5 |
| 2014/0155182 A1 * | 6/2014 | DeBlanco | A63H 33/008 | 472/136 |
| 2014/0283464 A1 * | 9/2014 | Vogler | E04B 1/34321 | 52/79.5 |
| 2015/0020463 A1 * | 1/2015 | Toubia | E04B 1/34321 | 52/79.9 |
| 2016/0002911 A1 * | 1/2016 | Hedler | E04B 1/34321 | 52/582.1 |
| 2016/0053477 A1 * | 2/2016 | McInerney | E04H 15/001 | 52/745.14 |
| 2016/0060895 A1 * | 3/2016 | Skolnekovich | E04H 1/1205 | 52/281 |
| 2016/0222645 A1 * | 8/2016 | Fay | E04B 7/12 | |
| 2017/0051497 A1 * | 2/2017 | Kolbe | E04B 1/3445 | |
| 2017/0121961 A1 * | 5/2017 | Hodson | E04B 1/34321 | |
| 2017/0211268 A1 * | 7/2017 | Eichhorn | E04C 2/24 | |
| 2017/0306610 A1 * | 10/2017 | Leahy | E04B 1/34321 | |

* cited by examiner

PORTABLE, PROTECTIVE SHELTER

TECHNICAL FIELD

Shelters are used in a variety of manners for people, animals, and plants. Shelters can be used as green houses, dog houses, carriers for animals, and for campers, hunters, disaster victims, and aid workers, among other uses. A shelter can protect people, animals, and plants from the environment (e.g., wind, rain, snow, bugs, and wildlife).

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIGS. 3-8 are perspective views of a shelter according to certain embodiments.

DETAILED DESCRIPTION

People and animals can use shelters for a variety of reasons. For example, people can use it as green houses, children can use play homes or play tents, campers can use tents or campers, hunters can use a tent or blind, people on vacation can use a removable truck camper, removable pop-up camper, or pull a camper behind a motor vehicle, people can use temporary or permanent outdoor toilets and showers, people can use permanent or semi-permanent housing, and disaster victims and/or aid workers can use a permanent or temporary shelter. Moreover, animal houses can be used to provide shelter for animals, and an animal carrier can be used to transport animals, such as dogs and cats, to a veterinarian, when relocating or on vacation.

Current shelters have several disadvantages. For example, and without limitation, such disadvantages include the shelters are not easily transportable. The shelters can be bulky and have heavy construction. Most shelters can require labor-intensive deployment and time consuming setup or assembly. Shelters generally provide limited protection from the environment. Additional parking space is needed for site staging and storage for campers or trailers. Fabric shelters have a limited use life due to degradation of the fabric and are susceptible to disintegration and rotting, while also having limited occupancy. Untreated wood can be harmful for use as an animal house. Traditional tents lack basic amenities, are less energy efficient, and less adaptable to various climates. Moreover, other shelters can include immovable shelter structures, which require heavy maintenance, are costly, lack the ability to customize the dimensions of the shelter, and any art work.

Thus, there is a need for a shelter that can be used to shelter plants, people, and animals that solves all of the disadvantages of traditional shelters. It has been discovered that a portable, protective shelter can include one or more wall segments and other components, such as a roof and floor, that can be easily assembled and disassembled via one or more fasteners located at one or more edges of the wall segments and other components. The shelters according to the various embodiments provide a light-weight, durable, easy to transport and assemble, and provide increased protection from the environment.

According to certain embodiments, a shelter comprises: at least two side walls; a back wall; and a roof, wherein the side walls, the back wall, and the roof comprise a material that is weatherproof, and wherein the shelter is detachable and portable.

According to certain other embodiments, a shelter comprises: at least two side walls, wherein an upper end of the at least two side walls conjoin to form a roof, wherein the at least two side walls comprise a material that is weatherproof, and wherein the shelter is detachable and portable.

According to certain other embodiments, a shelter comprises: at least two side walls; a front wall panel, wherein the front wall panel at least partially encloses a front end of the at least two side walls; a back wall panel, wherein the back wall panel at least partially encloses a back end of the at least two side walls; and a roof, wherein the at least two side walls, the front wall panel, the back wall panel, and the roof comprise a material that is weatherproof, and wherein the shelter is detachable and portable.

It is to be understood that the discussion of the various embodiments is meant to apply to all of the apparatuses without the need to continually refer to each embodiment for all of the apparatuses.

The shelter is detachable and portable. As used herein, the term "detachable" means the components of the shelter can be detached from one another and disassembled. As used herein, the term "portable" means the detached and disassembled shelter can be carried and moved by a person or motor vehicle all together or in sections. By way of example, the components of the shelter can be carried together, or wall sections can be carried separately from the roof and/or floor sections.

Figure 1:
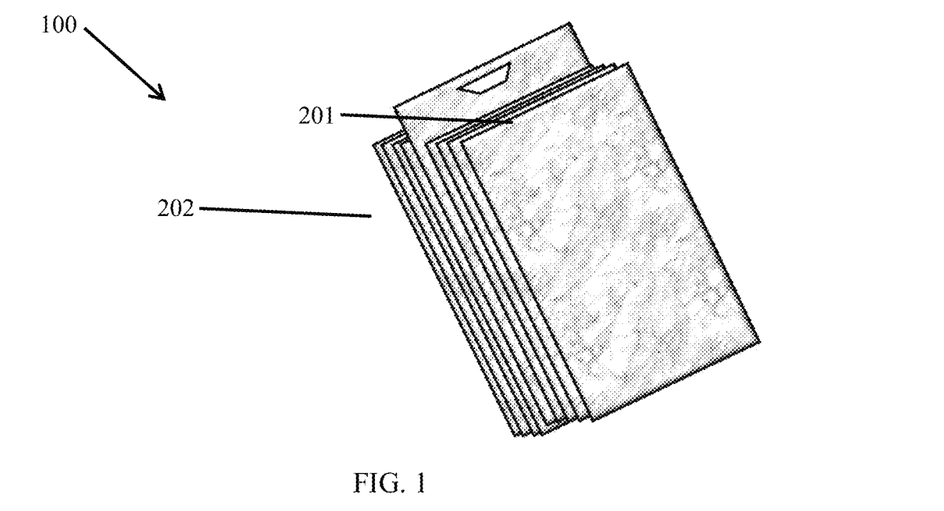
FIGS. 1 and 2 are perspective views of panels of a shelter in a stacked position according to certain embodiments.
Figure 2:
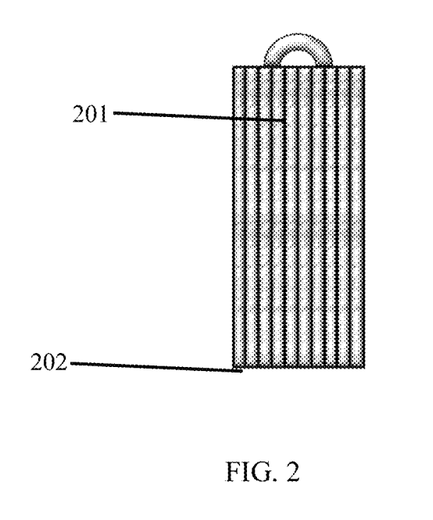

Turning to the figures, FIGS. 1 and 2 show one or more components of the shelter 100 in a collapsed, disassembled position. The shelter 100 is detachable, collapsible, and portable. The shelter 100 components can include one or more panels 202 or single units or combinations of both. The units and/or panels 202 can be folded, for example, in an accordion or stacked position. The units and/or panels 202 can be secured to each other via a strap, magnetic fasteners, or adhesive material (not shown) or other means for keeping the components together for transportation. A handle 201 can optionally be included or attached to one of the units or panels, wherein a person can carry the components. In this manner, the shelter 100 can easily be transported to a location.

Two or more panels 202 can be pre-assembled such that the two or more panels can be attached and folded together for easy portability and assembly. The units and/or panels 202 can also include removable wheels (not shown) on the bottom or be fitted into a frame having wheels on the bottom of the frame to assist in the portability of the components. The two or more panels 202, for example, can be pre-assembled via a hinge or other foldable attachment device, such as, without limitation, an adhesive tape, adhesive fabric, or a fiber reinforced fabric tape.

Figure 3:
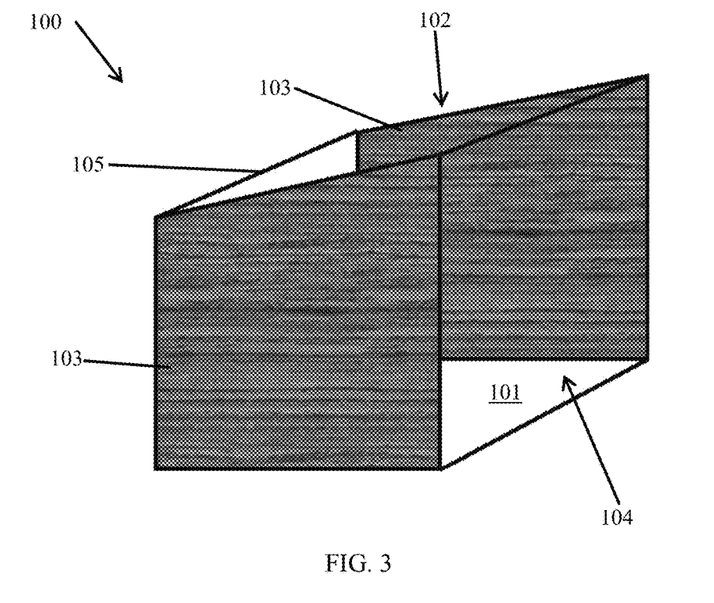

As can be seen in the figures, the shelter 100 can include at least two side walls 103, a back wall 105, a front wall 104, a roof 102, and a floor 101. FIG. 3 shows side walls, a front wall, a back wall, a roof, and a floor formed as single units.

FIGS. 5-7 and 14 show single units used to form the shelter 100 in different geometric shapes. The single units can be a variety of shapes and dimensions. Preferably, the shape of the units for the side walls 103 correspond with a shape of the unit for the roof 102 and/or floor 101 such that the units can be assembled into a shelter 100 that is weatherproof. As used herein, the term "weatherproof" means able to withstand exposure to weather without damage and protect occupants inside the shelter from the weather. Accordingly, the upper ends of the two side walls 103 and the back wall 105 should align such that water is prevented or substantially inhibited from entering the inside of the shelter 100.

Figure 4:
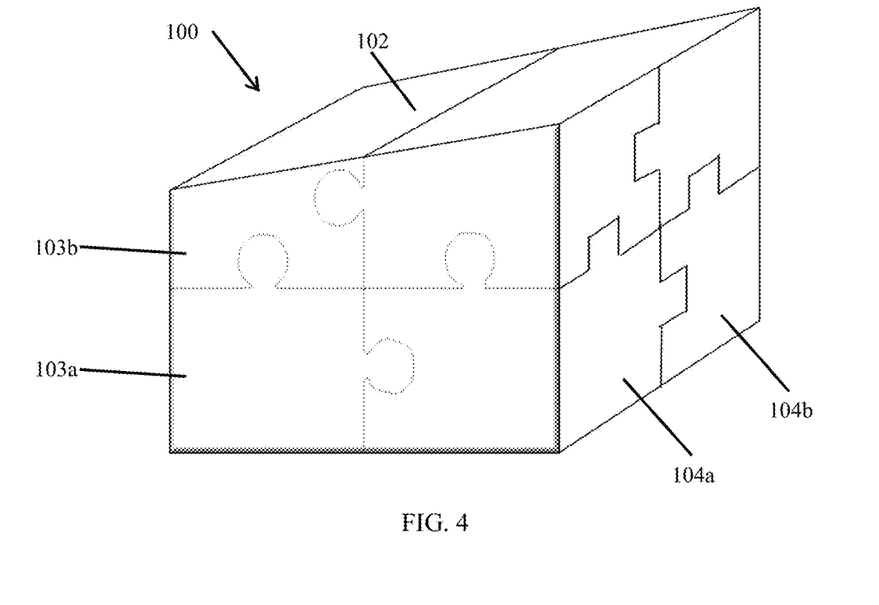
Figure 8:
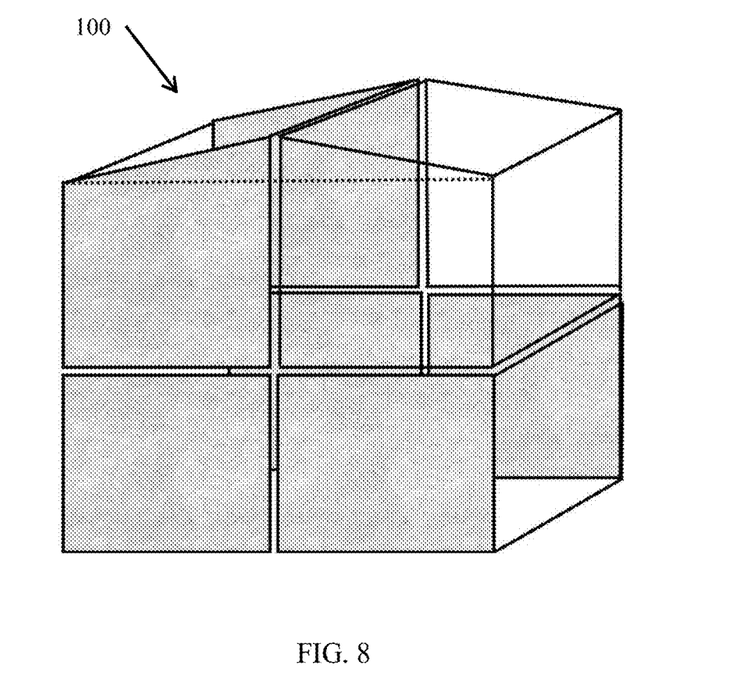

According to certain other embodiments, each of the side walls 103, front wall 104, back wall 105, roof 102, and floor 101 can be formed from two or more panels, for example as shown in FIG. 8. According to certain other embodiments, at least one of the side walls 103, front wall 104, and back wall 105 include panels while the roof and the floor are single units that are not comprised of panels. As shown in FIG. 4, the side walls 103 can include a first side wall panel 103a and a second side wall panel 103b and the front wall can include a first front wall panel 104a and a second front wall panel 104b. There can also be more than two side walls 103 and each side wall can also include more than two side wall panels. FIG. 4 shows side walls and a front wall including four panels and a roof including two panels.

Figure 6A:
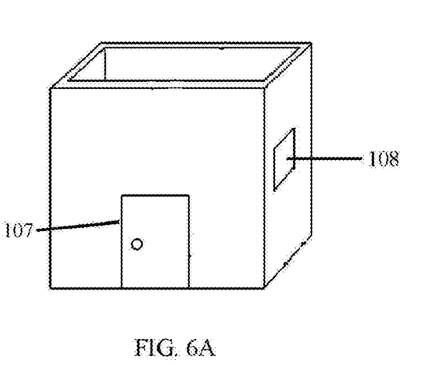
Figure 6B:
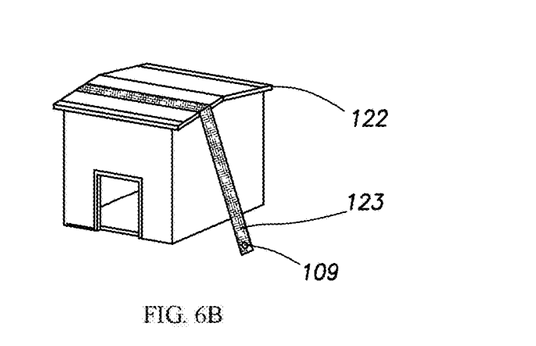
Figure 7:
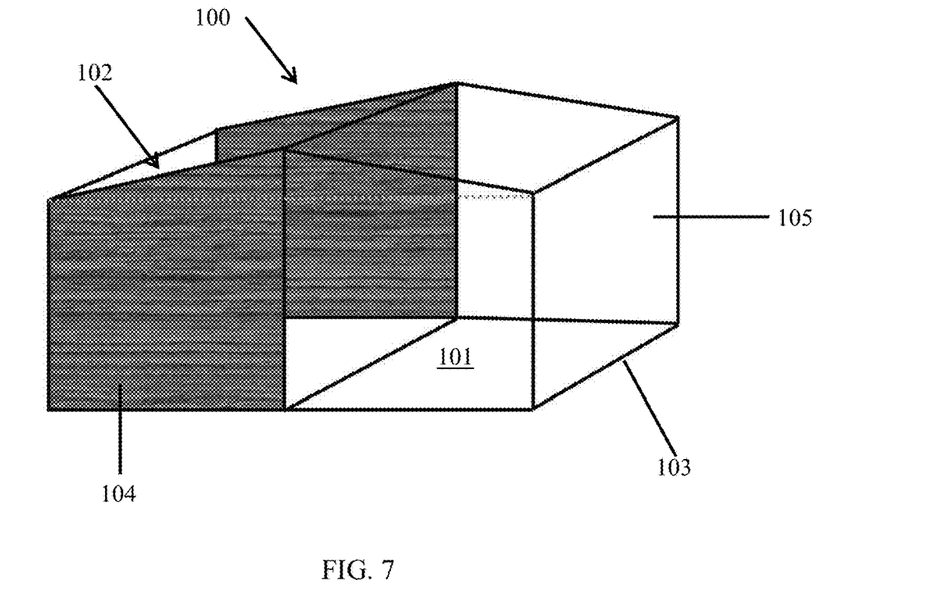
Figure 12:
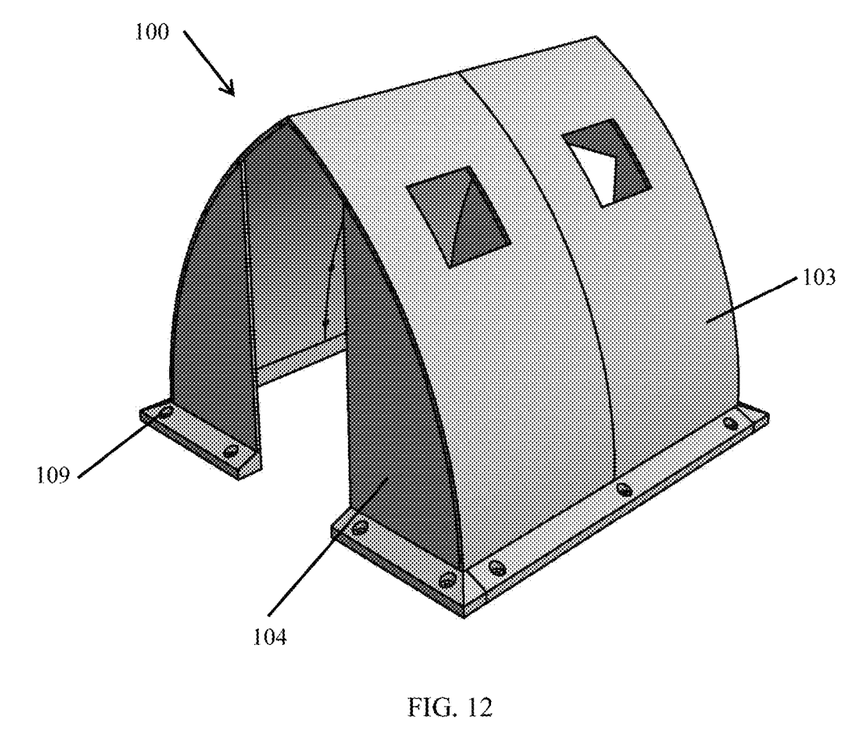
FIGS. 12-15 are perspective views of a shelter according to certain other embodiments.
Figure 13:
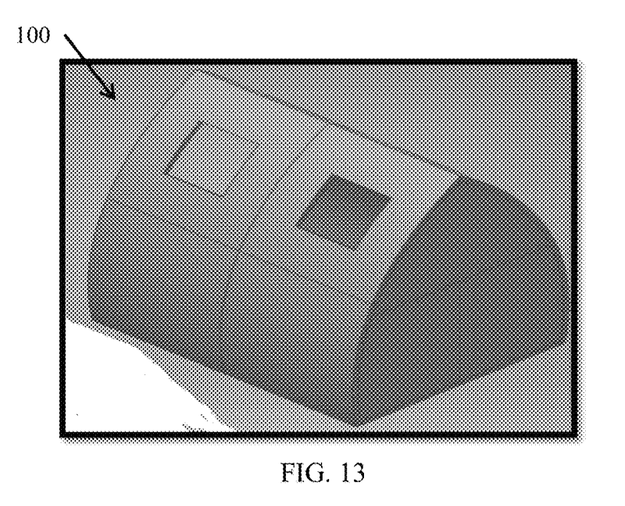
Figure 15:
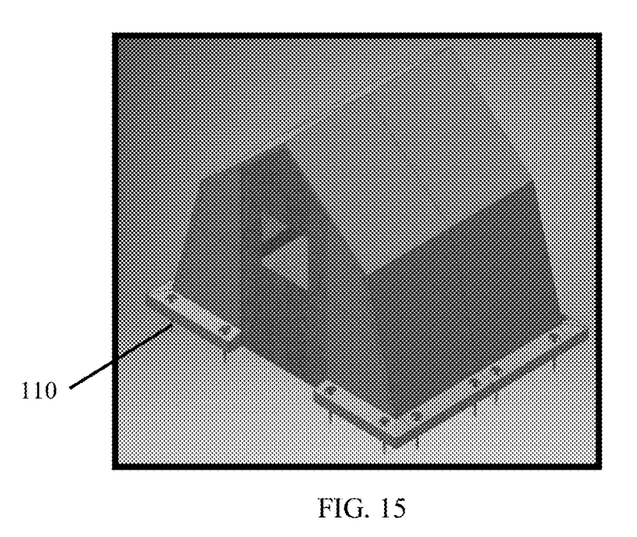

The pre-assembled components can be assembled by unfolding and positioning the panels 202 into a desired geometric shape. The desired geometric shape can be, without limitation, square, rectangular, octagon, pentagon, dome, and triangular. The panels 202 can be arranged side-by-side and can also stack on top of each other to provide a shelter 100 with the desired overall dimensions. In this manner, the shelter 100 is modular to accommodate a variety of different uses as well as size and number of people and/or animals to occupy the shelter 100. For example, FIG. 8 shows two of the walls (e.g., the side walls or the front wall and back wall) formed from four single units positioned side-by-side and on top of one another, while the other two of the walls are formed from two single units positioned on top of one another. FIGS. 12 and 15 show two side wall panels positioned side-by-side. FIG. 13 shows curved side walls of two panels positioned side-by-side, flat front wall panels positioned side-by-side, and curved roof panels positioned on top of the side walls and front wall. As can be seen in the various embodiments, the panels for forming the shelter can have a variety of geometric shapes and can be curved or flat in order to form the shelter, for example, a curved roof from FIG. 6B is shown positioned onto the side walls from FIG. 6A.

As shown in FIG. 4, matching panels can include one or more mating protrusions and one or more mating recesses for receiving the mating protrusion such that the panels can be assembled by fitting matching panels together to form a desired geometric shape. The protrusions correspondingly mate with matching recesses on another panel, wherein the mating engagement can be used to assemble the panels together to form the side wall, front wall, back wall, roof, and/or floor. The illustrative protrusions and recesses shown in FIG. 4 resemble a jig-saw puzzle; however it is to be understood that other protrusion and recess configurations can be used. An example of another protrusion and recess that can be used is where the protrusions are castellated and the recesses on a mating single unit or panel are square or rectangular in shape. The castellated protrusions can mate with and fit inside the recesses in order to assemble the shelter and provide improved stability. These castellated protrusions can be smaller in size than the protrusions shown in FIG. 4 and fit inside the recesses such that the protrusions are hidden from view. According to certain embodiments, the dimensions of the protrusions and recesses are selected such that after assembly, the shelter 100 has stability from falling or having the panels become prematurely disassembled.

The pre-assembled components made of panels 202 or single units that form the side walls, front wall, back wall, roof, and floor can vary in dimensions. According to certain embodiments, the pre-assembled components have dimensions such that the pre-assembled components are capable of being hand-carried, fit onto and/or towed on a bike or motorcycle, and can fit into: the trunk of a car with or without back seats folded down; an SUV; and the bed of a pick-up truck or other vehicles, without limitation. According to certain embodiments, single units can have largest dimensions ranging from about 24 inches (in.) to about 10 feet (ft.). The panels can have largest dimensions ranging from about 12 in. to about 10 ft. The assembled shelter 100 can have dimensions capable of housing the size and number of people and/or animals to occupy the shelter. According to certain embodiments, the largest dimensions of the assembled shelter 100 range from about 24 in. wide by 24 in. tall by 24 in. deep to about 100 ft. wide by 15 ft. tall by 100 ft. deep.

Figure 5:
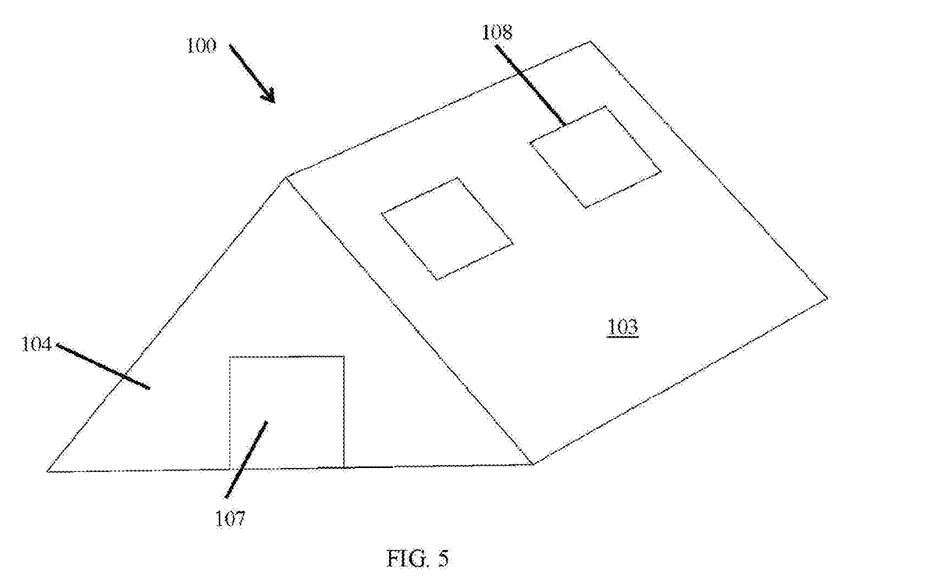

According to certain embodiments, the shelter 100 includes the roof 102. The roof 102 panels or single unit can include flaps 122 that attach to the side walls to create a weatherproof shelter. According to certain other embodiments, as shown in FIGS. 5 and 12, an upper end of the side walls 103 conjoin to form a roof. After assembly of the side walls 103 to form the roof via the fasteners (discussed below), the seam where the upper ends of the side walls meet can be covered with a flap of material (not shown) to create a weatherproof shelter.

Figure 14:
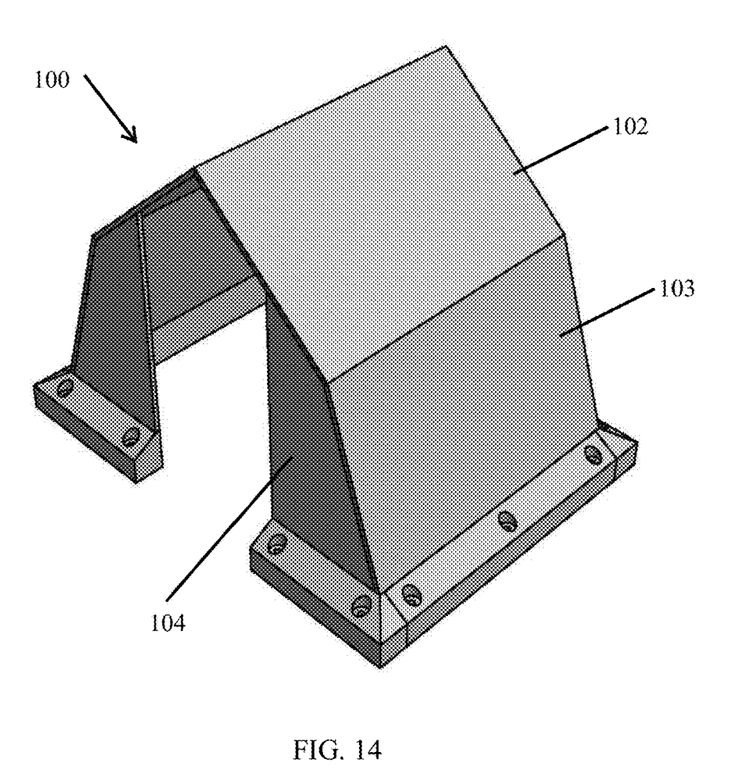

The shelter 100 does not need to include a front wall 104 or a back wall 105. The shelter can also include only a back wall 105 with no front wall 104. According to certain other embodiments, as shown in FIGS. 12-14, the shelter 100 can include a front wall panel, wherein the front wall panel at least partially encloses a front end of the at least two side walls; and a back wall panel, wherein the back wall panel at least partially encloses a back end of the at least two side walls. In this manner, a natural opening can exist in the space that is not enclosed by the front wall panel and back wall panel. Of course more than one panel can form the natural opening. According to certain other embodiments, the natural opening between the partially enclosed front and back walls can also be enclosed by an insulating fiber or fabric as shown in FIG. 14. The enclosure to the natural opening can also be a rigid material in the form of a door 107 that is made from a single material or multiple layers of material.

The components of the shelter 100 (i.e., the side walls, front wall, back wall, roof, and floor) can be made of a variety of materials. According to certain embodiments, the material(s) when used as a single layer or in combination with each other are waterproof, abrasion resistant, anti-corrosive, resistant to chemicals, the environment, or atmosphere, decorative, and provide structural enhancement. The components can be made from one or more layers of materials, including, but not limited to, a base material, an insulating material, a reinforcing material, a wall paper, magnetic strips, adhesive strips, and a coating. The base material and/or insulating material can be selected from the group consisting of polystyrene, polyurethane, PVC foam core, balsa foam core, polyisocyanurate, foam boards, fabric, celluloses, reinforced celluloses, plant fibers, fiberglass, plastics, polycarbonates, wood, lightweight metals or metal alloys, and combinations thereof. The reinforcing material for further structural enhancement and improved impact resistance of the base and/or insulating material can be selected from the group consisting of high performance fibers or fabrics, such as fiberglass; graphene or graphene oxide fibers or rods; carbon fibers; carbon tubes; carbon lattices; other fiber reinforced composite materials; metals; metal alloys; and combinations thereof. The coating can be selected from polyurea, polyurethane, curable resins, such as epoxy resins, fiberglass, and vinyl esters. The sequences of layers of materials can be as follows: the coating, the base material, the insulating material, the reinforcing material, and another layer of coating; the coating, the insulating material, the base material, the insulating material, and another layer of coating; or a base material that includes the insulating material and the reinforcing material, and the coating that completely surrounds the base material. In certain embodiments, multiple layers are not needed because the material functions as the base material, insulating material, reinforcing material, and coating. An example of a single material that serves all of these functions is a fiber composite INNEGR™ sold by Innegra Technologies in Greenville, S.C. The material(s) can be selected such that the weight of the units can be reduced; impact resistance and damage tolerance improved; and rust or biodegradation is inhibited or prevented.

The one or more layers can be made from an environmentally friendly material, such as recycled products. The base material can be carved into desired textures or shapes as art work. The material(s) can be selected to provide desired properties. Examples of such properties include, but are not limited to, light weight, low temperature, semi-rigid to rigid, and buoyancy. In order to provide a lightweight shelter, the single units and panels can have a weight in the range of about 1 pound to about 5 pounds. The coating or single material if multiple layers are not used can form a hardened substance on the outside and/or inside of the other layers of materials in order to provide weatherproofing and enhanced physical properties to the components. The coating or single material can form a non-porous, scratch-free hardened shell to protect against environmental elements, such as water and ultraviolet rays, and allow for an easy wipe down, among other things. Some or all of the components can be painted with a colored paint. By way of example, for hunters, the outside of the shelter can be painted in a camouflage pattern and color scheme. According to certain embodiments, the materials form a rigid structure.

Figure 9:
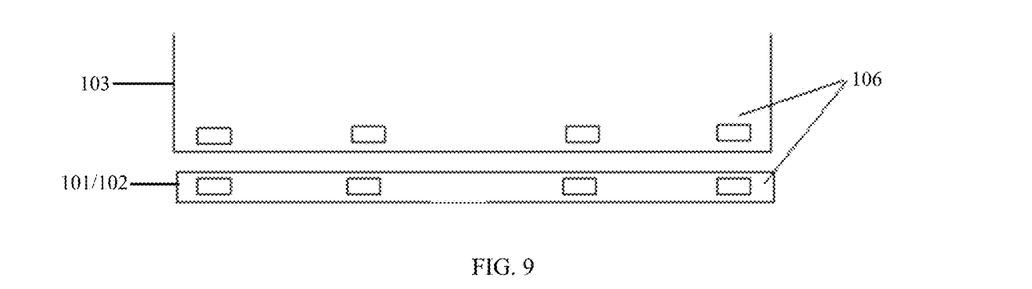
FIGS. 9 and 10 are cross-sectional views of a means for removably attaching components of a shelter according to certain embodiments.

The roof 102 and/or floor 101 can be temporarily joined to the side, front, and/or back walls of the shelter 100 after the geometric shape has been formed via one or more fasteners 106. According to certain other embodiments, any of the components of the shelter (e.g., the roof, side walls, front wall, back wall, and floor) can be temporarily joined together via one or more fasteners, for example as shown in FIG. 9. The fasteners can be, without limitation, magnets, adhesive tape, or VELCRO®. In this manner, the modular shelter can be easily assembled and disassembled. The overall dimensions of the assembled shelter can vary and can be formed by combining multiple wall panels, for example, to form higher or lower heights, lengths, and/or depths of the walls. The overall dimensions can be selected to accommodate the desired size (e.g., animals versus people) and number of occupants.

Figure 10:
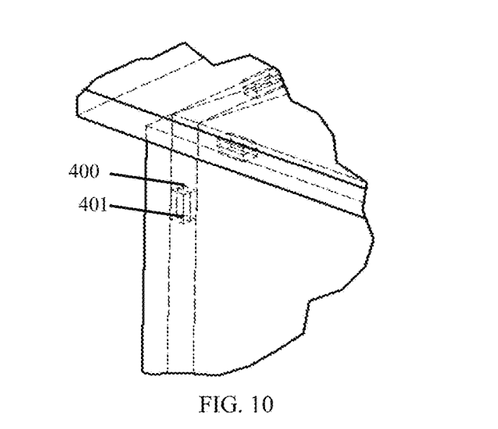

For magnetic fasteners 106, a plurality of magnets, strips of magnets, or magnetic strips can be located at the edges of the components of the shelter. The magnetic fasteners can be adhered to the outside of the shelter or positioned between two layers of materials making up the components of the shelter. If the magnetic fasteners are located between two layers of material, then preferably, the placement of the magnetic fasteners is selected such that the strength of the magnetic fasteners is not substantially reduced. By way of example, the magnetic fasteners can be positioned directly underneath the coating layer. As shown in FIG. 10, the edges of the components can include a recess 400 for housing a magnetic fastener 401. As discussed above, a corresponding component can include a protrusion that houses a corresponding magnetic fastener such that the components can be attracted to each other and join the components together to form the shelter. According to other embodiments, only recessed magnetic fasteners are used without magnetic fastener protrusions. The base and/or insulating material can further have a single layer or multiple layers of protective coating or a high-performance fiber reinforcement that makes the recesses 400 and magnetic fasteners 401 virtually unnoticeable as well as reduce and/or eliminate any dangers or risks related to direct exposure to magnetic fasteners.

The magnets can be positioned such that the components are able to be assembled by different poles attracting each other. For example, a magnet can be positioned onto an edge of a first panel having its north pole facing away from the edge; while a corresponding other magnet can be positioned onto an edge of a second panel having its south pole facing away from the edge. In this manner, the opposite poles will attract each other and adhere the two panels together. The number, location, and placement of the magnetic fasteners can be selected, based in part on the strength of the magnetic fasteners, the weight of the components, the size of the components, and the overall dimensions of the assembled shelter. When a plurality of magnetic fasteners is used appropriately throughout the shelter for assembly, it makes the shelter safe and strong. This reduces and/or in some cases eliminates the need of using conventional hardware as fasteners that are time-consuming and require skill for assembly. The shelter 100 can be assembled by positioning the single units and/or panels adjacent to each other such that the magnetic fasteners attract each other. This assembly can be done by trial and error or preferably according to labeled or numbered components and an instruction manual. Depending on the shape and size of the shelter, panels and/or single units can also have unified indented magnetic fasteners such that the assembly does not require any labeled or numbered components or an instruction manual.

For adhesive tape or VELCRO®, the fasteners can be positioned along the edges of the components such that the components are capable of being assembled into the shelter. To assemble the shelter, the components can be positioned side-by-side and/or on top of one another.

For any of the fasteners, the location of the fasteners should be located along the appropriate edges of the components to enable assembly of the shelter. By way of example, fasteners can be located along a top, perimeter edge of the floor or the bottom, perimeter edge of the roof; while other fasteners can be located along a bottom edge of a side wall. In this manner, the side wall can be positioned directly above the top, perimeter edge of the floor or directly below the bottom, perimeter edge of the roof in order to secure the side walls to the floor and roof. As stated above, the roof can further include a flap of material along the top, perimeter of the roof whereby the flap can be moved down to removably attach to the top, perimeter edge of a side wall. This flap can provide further stability and help prevent or inhibit the roof from becoming dislodged from the side walls. Preferably, the location of the fasteners, along with the flap of material and any other features are selected such that the shelter is stable. This stability and rigidity can help inhibit or prevent the shelter from collapsing.

The shelter 100 can further include an anchoring device. According to certain embodiments, the anchoring device includes anchor holes and an anchor. As can be seen in FIGS. 12, 14, and 15, the walls (i.e., side walls, front wall(s), and back wall(s)) can further include a flange located at the bottom of the walls. The flange can also be located around a perimeter of the floor 101. The flange can include one or more anchor holes 109. The anchor holes 109 can be sized and positioned to receive an anchor 110, such as a metal or plastic stake. The anchor can have an outer diameter body that is less than the diameter of the anchor holes 109. The anchor holes 109 can include a recess that has a larger diameter than the inner diameter of the hole. The anchor 110 can include a head that has a larger outer diameter than the outer diameter of the body of the anchor. In this manner, the body of the anchor can fit through the anchor hole, while the head of the anchor can fit within the recess of the anchor hole such that the anchor is prevented from descending all the way through the anchor hold. The anchor can also have a desired length. The anchors can be inserted through the anchor holes 109 and inserted into the ground. The length of the anchors can dictate the amount of extra stability to the shelter.

Figure 16:
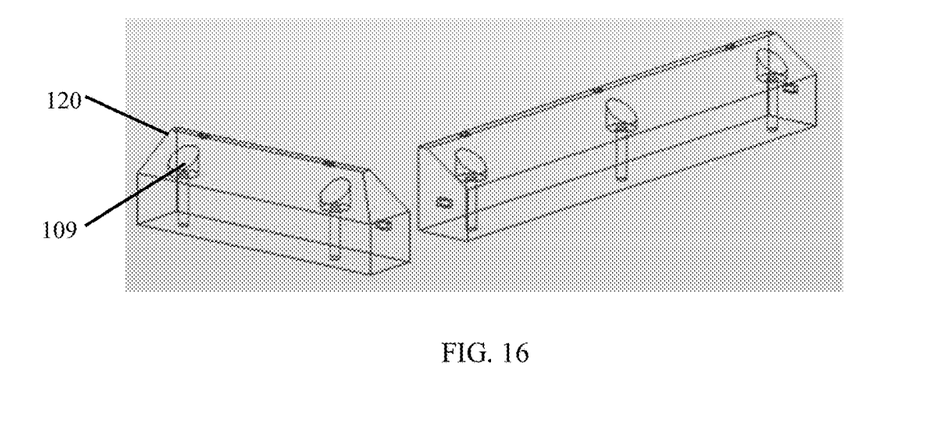
FIGS. 16 and 17 are perspective views of a floor frame according to certain other embodiments.
Figure 17:
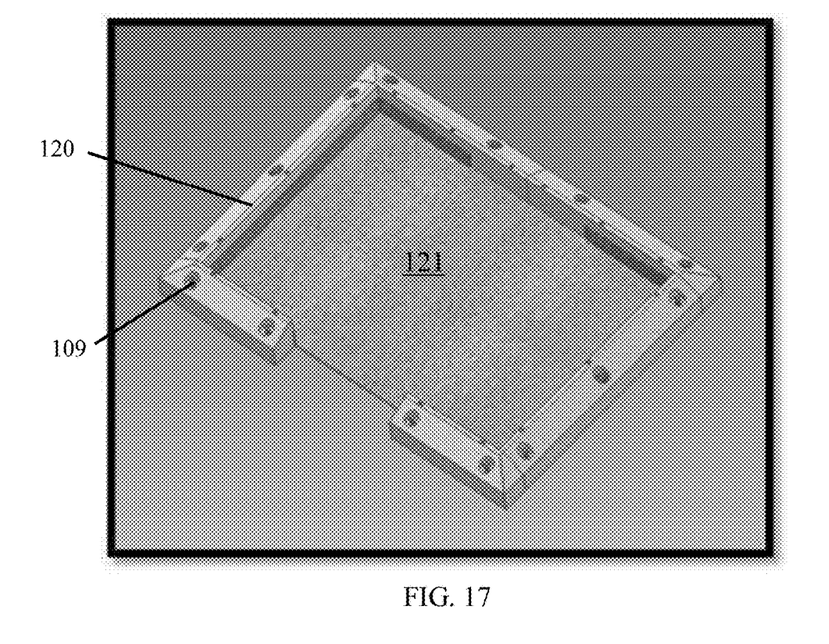

According to certain other embodiments and as shown in FIGS. 16 and 17, the shelter 100 can further include a floor frame 120. The floor frame 120 can include multiple segments that are joined together using the fasteners to form the floor frame. The floor frame 120 can include the anchor holes 109. The side walls 103, front wall 104, and/or back wall 105 can be attached and assembled to the top of the floor frame 120 via the fasteners. As shown in FIG. 17, the floor frame 120 can house the floor 101. The floor 101 in FIG. 17 is shown to be made of a fabric; however it is to be understood that any of the materials or layers of materials discussed above can be used. The floor 101 can be secured to floor frame 120 via any of the fasteners.

According to certain other embodiments, the anchoring device includes one or more straps 123 that can be placed over the top and sides of the shelter. The straps 123 can include anchor holes 109 at the ends of the straps. Anchors can be placed through the anchor holes 109 and inserted into the ground in order to provide extra stability to the shelter.

The shelter 100 can include one or more openings, such as a window opening 108 and a door opening 107. The window openings can include a screen and a removable or openable covering for allowing air flow into the shelter while keeping flying insects or wildlife out. The door opening can contain a door that is made from a weatherproof single material or layers of materials, as discussed above with reference to the components of the shelter, and can provide access to and from the shelter. For animal shelters, the door can be a bidirectional flap that can be locked to prevent the animal from entering or leaving the shelter, or unlocked to allow an animal access to and from the shelter. The shelter can also include one or more additional features. The additional features can include, without limitation, a power source (including solar powered sources), lights, electrical sockets, charging ports, furniture, urinals, showers, and toilets.

Figure 11:
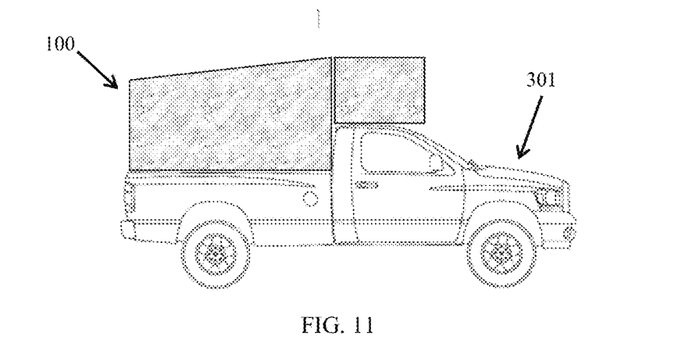
FIG. 11 is a perspective view of a means for transporting the shelter according to certain embodiments.

The shelter can also be removably mounted to a bed of a motor vehicle 301, for example, a pick-up truck and optionally above the cab of the pick-up truck, for example, as shown in FIG. 11.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While devices and methods are described in terms of "comprising," "containing," or "including" various components or steps, the devices and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A shelter comprising:
   at least two side walls;
   a back wall; and
   a roof,
   wherein the side walls, the back wall, and the roof comprise a material that is rigid and weatherproof,
   wherein the shelter is detachable and portable,
   wherein the side walls, back wall, and roof are removably joined together via one or more magnetic fasteners,
   wherein the material comprises:
      a layer of a base material, wherein the base material is a PVC foam core;
      at least one layer of a reinforcing material, wherein the reinforcing material is fiberglass;
      a fabric layer, wherein the fabric layer is a fiber composite; and
      a coating layer, wherein the coating layer is an epoxy resin, and wherein the coating layer completely surrounds the base material, reinforcing material, and fabric layer, and
      wherein the magnetic fasteners are embedded within the PVC foam core near a perimeter of the PVC foam core and are positioned directly underneath the coating layer.

2. The shelter according to claim 1, wherein at least one of the side walls, back wall, and roof comprise two panels, wherein the two panels are positioned side-by-side or on top of one another, or wherein at least one of the side walls, back wall, and roof comprise four or more panels, wherein the four or more panels are positioned both side-by-side and on top of one another.

3. The shelter according to claim 2, wherein the two or four or more panels comprise one or more mating protrusions and one or more mating recesses for receiving the mating protrusion such that the panels are assembled by fitting matching panels together to form the shelter, and wherein the magnetic fasteners are positioned on at least one of the mating protrusions and at least one of the mating recesses.

4. The shelter according to claim 1, wherein the shelter has a geometric shape selected from cubic, hyperrectangular, octagon, pentagon, dome, and pyramid.

5. The shelter according to claim 1, wherein the roof comprises one or more flaps that attach to the side walls.

6. The shelter according to claim 1, wherein the material comprises layers of materials selected from the group consisting of a base material, an insulating material, a reinforcing material, a wall paper, paint, the coating, and combinations thereof.

7. The shelter according to claim 1, wherein the edges of at least the side walls, back wall, and roof comprise a recess for housing the magnetic fasteners.

8. The shelter according to claim 1, further comprising an anchoring device for anchoring the shelter to a surface of a ground.

9. The shelter according to claim 8, wherein:
the anchoring device comprises a flange, one or more anchor holes, and one or more anchors,
the side walls and back wall further comprise the flange located at the bottom of the walls; or
an outer perimeter of a floor comprises the flange; or
a floor frame comprises the flange; and
wherein the flange comprises the one or more anchor holes for receiving the one or more anchors.

10. The shelter according to claim 1, wherein the shelter has largest dimensions in the range from 24 inches wide by 24 inches tall by 24 inches deep to about 100 feet wide by 15 feet tall by 100 feet deep.

11. The shelter according to claim 1, further comprising one or more of a floor, a door, a window, a power source, a solar powered source, lights, electrical sockets, charging ports, furniture, urinals, showers, and toilets.

12. The shelter according to claim 1, wherein the length of the side walls correspond to a length of the roof and/or a floor, and wherein the width of the back wall corresponds to the width of the roof and/or a floor such that shelter is weatherproof.

13. The shelter according to claim 1, wherein the magnetic fasteners are selected from a plurality of magnets, a plurality of strips of magnets, or magnetic strips.

14. The shelter according to claim 1, wherein the magnetic fasteners are located at edges of the at least two side walls, the back wall, and the roof.

15. The shelter according to claim 9, wherein the one or more anchors are selected from a metal stake or plastic stake.

16. The shelter according to claim 8, wherein the anchoring device comprises one or more straps and two or more anchors, wherein the one or more straps are positioned over a top and sides of the shelter, wherein the one or more straps comprise a first and second anchor hole located at a first and second end of the straps, and wherein the two or more anchors are positioned through the first and second anchor hole and inserted into a ground.

* * * * *